3,184,340
ELECTRODE FOR ELECTROCHEMICAL DEVICE
Henri Georges André, Montmorency, France, assignor to Yardney International Corp., New York, N.Y., a corporation of New York
No Drawing. Filed June 5, 1961, Ser. No. 114,603
Claims priority, application France, June 9, 1960, 829,501
6 Claims. (Cl. 136—78)

The present invention relates to electrical accumulators or storage batteries and, more particularly, to electrodes that are useful in such accumulators.

It is known that in certain electrical accumulators containing comminuted electrode material, the active material contained in the electrodes tends to cake and become less porous after a certain number of working cycles. As a result the capacity of the accumulator is diminished.

In an effort to avoid this problem, it has been suggested to add lithium hydroxide to the electrolyte in certain accumulators such as the alkaline-nickel or alkaline-silver accumulators. This lithium hydroxide has been dissolved in an potassium or sodium hydroxide solution which constitutes the electrolyte.

This means for solving the above mentioned problem has had only limited success because of the excessive solubility of the lithium hydroxide in the electrolyte. Furthermore, the beneficial effect of the lithium hydroxide disposed in the electrolyte diminishes after a number of working cycles of the accumulator when its effect is most necessary.

It is an object of this invention to provide a process for the introduction of lithium hydroxide into an accumulator under conditions which favor the maximum utilization of its beneficial effects.

It is another object of this invention to furnish an accumulator which works better and for longer periods of time than the previous accumulators of the same type, in which lithium hydroxide was introduced into the cell in the usual manner.

It is a further object of this invention to furnish a process which retains for the active material in an alkaline accumulator its state of division and its capacity of adsorption and absorption.

It is still a further object of this invention furnish a process which can be used easily and economically.

Other and more detailed objects will be apparent from the following description and claims.

It has now been found that the above objects can be attained if the lithium hydroxide is introduced into the electrode which is to be protected during its construction. This is achieved by soaking the electrode in an appropriate solution of lithium hydroxide. More particularly, the objects of this invention are obtained by soaking or otherwise contacting said electrode with a concentrated solution of lithium hydroxide. The concentration of the lithium hydroxide must be such as to be greater than that reached in the electrolyte of the accumulator. To accomplish this the electrode is soaked in a warm solution of lithium hydroxide whose concentration is higher than saturation concentration under normal temperature conditions, so that when the electrode has been removed from the solution and cooled a precipitate of lithium hydroxide is produced in the pores of the electrode.

Electrodes prepared in accordance with this invention contain a reserve of crystalline lithium hydroxide. This enables the electrode to replenish the electrolyte system with lithium hydroxide which is used by secondary reactions during the life of the accumulator.

The electrode made according to the invention is preferably immediately incorporated in the accumulator, so as to prevent carbonization.

In addition to incorporating lithium hydroxide in the electrode in accordance with the present invention, lithium hydroxide may also be incorporated in the electrolyte by saturating the electrolyte with lithium hydroxide.

This invention may be applied advantageously, but not limitatively, to the case where the electrode impregnated with lithium hydroxide is wrapped in a film in one or many layers of semi-permeable material, such as cellophane, thereby preventing the migration of the crystals of lithium hydroxide.

The process described herein is also applicable not only to the introduction of lithium hydroxide into the accumulator, but to the introduction of other crystallizable substances. This is accomplished by soaking said electrode of comminuted active material in the warm solution of one of the said substances and then cooling the electrode.

The following example is further illustrative of this present invention. It is to be understood, however, that it is not limited thereto.

*Example*

A supersaturated solution (with respect to the saturation concentration at normal or room temperature) of lithium hydroxide is prepared by mixing 15% by weight of lithium hydroxide with pure water and boiling at 103° C. thereby the major portion of the lithium hydroxide dissolves. A sintered silver electrode prepared in accordance with U.S. Patent 2,818,462 is immersed in the boiling solution of lithium hydroxide and the solution is permitted to boil for a few more minutes. In this fashion impregnation of the core of the active material by lithium hydroxide is accomplished while at the same time relieving the electrodes of materials which are too fine and of colloidal dimensions, such materials ordinarily having the tendency to accelerate the caking of the active particles and to disturb the flow of current in the core of the electrode.

The treating solution containing the electrode is cooled to a temperature near the atmospheric (room) temperature (for example 30° C.). Because of the phenomenon of supersaturation, crystallization of the lithium hydroxide occurs slovenly. The electrode is removed from the solution and is dried under ambient conditions. Better results are obtained by drying in a direct current of warm gas free from carbon dioxide, or better yet the electrodes can be dried under vacuum.

The electrodes so treated are, preferably, mounted immediately in the accumulators to prevent rapid carbonization in the atmosphere.

The electrodes so obtained are advantageously employed with a semi-permeable separator which favors the localization of lithium hydroxide. This arrangement is best used in electrochemical couples such as silver-zinc or silver-cadmium/iron. Thus for example the sintered silver electrode treated with lithium hydroxide, as described above, could be used as the sintered silver electrode in the system described in U.S. Patent 2,635,127, using an aqueous solution of KOH as the electrolye. Another system wherein the electrode made in accordance with the present invention may be employed is described in U.S. Patent 2,719,874.

The electrodes of the present invention may be used with all types of semi-permeable separators in all types of alkaline accumultors, including the salt containing types. They may be used, for example, in accumulators with invariable electrolyte of nickel cadmium, or nickel-iron, or nickel-cadmium/iron or other types (oxide of mercury, oxide or copper, nickel-zinc, etc.). Such accumulators acquire a greater capacity which is retained for longer periods of time because of the adsorption and the absorption of the electrolyte in the electrodes.

Numerous modifications and embodiments of this invention can be made without departing from the spirit and scope thereof, it being understood that the invention is not to be limited to specific details of the foregoing disclosure except as defined in the appended claims.

What is claimed is:

1. A method of substantially maintaining, upon repeated cycling, the capacity of a storage-battery cell having a positive electrode in the form of a porous body of active material, a negative electrode and an alkaline electrolyte selected from the group which consists of aqueous solutions of sodium hydroxide and potassium hydroxide permeating said electrodes, said method comprising the treatment of said positive electrode, just prior to its introduction into the cell, by the following steps:
   (a) precipitating crystallized lithium hydroxide from an aqueous solution in the pores of said body;
   (b) removing said body from said solution; and
   (c) drying said body.

2. A method of substantially maintaining, upon repeated cycling, the capacity of a storage-battery cell having a positive electrode in the form of a porous body of active material, a negative electrode and an alkaline electrolyte selected from the group which consists of aqueous solutions of sodium hydroxide and potassium hydroxide permeating said electrodes, said method comprising the steps of saturating said electrolyte with lithium hydroxide and treating said positive electrode, just prior to its introduction into the cell, by the following steps:
   (a) precipitating crystallized lithium hydroxide from an aqueous solution in the pores of said body;
   (b) removing said body from said solution; and
   (c) drying said body.

3. A method of substantially maintaining, upon repeated cycling, the capacity of a storage-battery cell having a positive electrode in the form of a porous body of active material, a negative electrode and an alkaline electrolyte selected from the group which consists of aqueous solutions of sodium hydroxide and potassium hydroxide permeating said electrodes, said method comprising the treatment of said positive electrode, just prior to its introduction into the cell, by the following steps:
   (a) precipitating crystallized lithium hydroxide in the pores of said body by immersing said body in a boiling solution of lithium hydroxide at a concentration exceeding the saturation concentration at room temperature and subsequently cooling said solution to substantially room temperature with said body still immersed therein;
   (b) removing said body from said solution; and
   (c) drying said body.

4. A method of substantially maintaining, upon repeated cycling, the capacity of a storage-battery cell having a positive electrode in the form of a porous body of active material, a negative electrode and an alkaline electrolyte selected from the group which consists of aqueous solutions of sodium hydroxide and potassium hydroxide permeating said electrodes, said method comprising the steps of saturating said electrolyte with lithium hydroxide and treating said positive electrode, just prior to its introduction into the cell, by the following steps:
   (a) precipitating crystallized lithium hydroxide in the pores of said body by immersing said body in a boiling solution of lithium hydroxide at a concentration exceeding the saturation concentration at room temperature and subsequently cooling said solution to substantially room temperature with said body still immersed therein;
   (b) removing said body from said solution; and
   (c) drying said body.

5. A battery cell comprising a positive electrode consisting essentially of a porous body of active material with lithium hydroxide crystallized in the interstices thereof; a negative electrode of a material forming an electrochemical couple with said active material; and an alkaline electrolyte selected from the group which consists of aqueous solutions of sodium hydroxide and potassium hydroxide in contact with said electrodes and saturated with lithium hydroxide.

6. A battery cell comprising a positive electrode consisting essentially of a porous body of sintered silver with lithium hydroxide crystallized in the interstices thereof; a negative electrode of a material forming an electrochemical couple with silver; an alkaline electrolyte selected from the group which consists of aqueous solutions of sodium hydroxide and potassium hydroxide in contact with said electrodes and saturated with lithium hydroxide and semipermeable separator means between said electrodes.

References Cited by the Examiner

UNITED STATES PATENTS

| 2,865,974 | 12/58 | Scheuerle | 136—30 |
| 2,880,258 | 3/59 | Pucher et al. | 136—31 |
| 2,997,518 | 8/61 | Klopp et al. | 136—90 |
| 3,042,551 | 7/62 | Perry | 117—224 |

OTHER REFERENCES

Jones: Inorganic Chemistry, August 947, pages 196–197.

JOHN H. MACK, *Primary Examiner.*
MURRAY TILLMAN, *Examiner.*